Oct. 12, 1954  B. F. BUDD  2,691,385
SAFETY VALVE FOR HYDRAULIC BRAKES
Filed June 9, 1949

Inventor
Baylis F. Budd

By

E. V. Hardway,
ATTORNEY.

Patented Oct. 12, 1954

2,691,385

UNITED STATES PATENT OFFICE 2,691,385

SAFETY VALVE FOR HYDRAULIC BRAKES

Baylis F. Budd, Houston, Tex., assignor of one-half to Carrie Asbeck, Harris County, Tex.

Application June 9, 1949, Serial No. 98,080

3 Claims. (Cl. 137—399)

This invention relates to a safety valve for hydraulic brakes.

An object of the invention is to provide an automatic safety valve adapted to be connected into the line leading from the master cylinder to the brake mechanism of a motor vehicle.

However, the safety check valve is capable of use in any type of fluid pressure line.

In hydraulic brake systems now commonly used on motor vehicles in case a leakage occurs in either line the brakes of all of the wheels are affected for the reason that the fluid in the master cylinder drains out. With the present invention the safety valve is incorporated into each of the lines adjacent the master cylinder, and in case a leakage occurs in either line, usually at the wheel brake mechanism, that line will be closed and the brake fluid will be retained in the master cylinder and the brakes of the other wheels will operate normally.

It is a further object of the present invention to provide a very simple type of valve assembly, including only a casing and a valve and which will immediately close in case of leakage on the downstream side and which may be easily opened when the leakage is repaired.

Other objects and advantages will be apparent from the following specification which is illustrated by the accompanying drawings, wherein.

Figure 1:
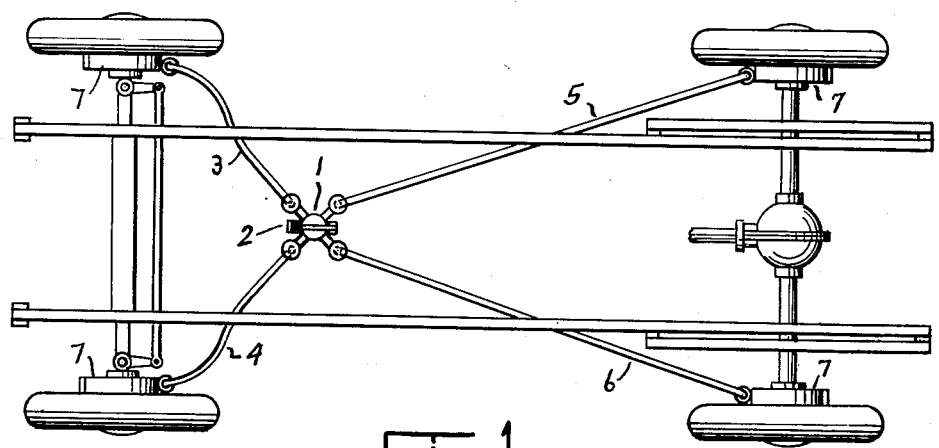
Figure 1 is a plan view of a motor vehicle chassis showing a diagrammatic view of the fluid brake system.
Figures 2, 3:
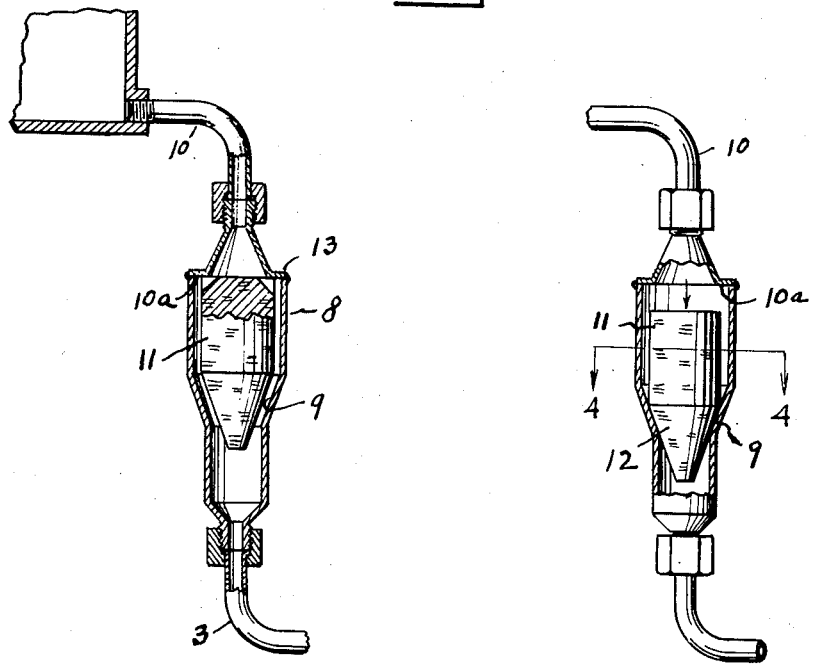
Figure 2 is an enlarged vertical sectional view of the valve assembly in open, or operative, position.
Figure 3 is a side view, partly in section, of the valve assembly in closed position.
Figure 4:
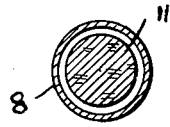
Figure 4 is a cross-sectional view taken on the line 4—4 of Figure 3.

Referring more particularly to the drawing, the numeral 1 designates the master cylinder, and associated therewith there is a conventional brake lever 2 by means of which the brakes may be applied.

Leading from the master cylinder there are the lines 3, 4, 5, and 6, which lead to the corresponding brake mechanisms of the respective wheels, said mechanisms being of similar construction and indicated by the numeral 7.

A safety valve is incorporated into each of said lines. Each valve comprises a valve casing 8 which has a downwardly converging portion, midway its ends, forming a tapering valve seat 9.

Leading from the master cylinder 1, there is a tubular connection 10 which is connected to the upper end of each valve casing 8, and the line leading to the corresponding brake mechanism is connected into the lower end of said valve casing.

The valve casing above and beneath the seat is of approximately cylindrical shape, and spaced above the seat 9 the casing is provided with an internal annular stop 10a.

In the valve casing 8 there is a valve 11 whose upper portion is cylindrical and whose lower end is tapered, as at 12, to conform to the taper of and to seat upon the seat 9 when the valve is closed.

The upper end of the valve is of a diameter to abut the stop 10a when the valve is open.

This valve is formed of cork or other light material, and normally is held floating in its upper position since the valve casing will be filled with liquid during normal operation of the system.

During normal operation of the brake system, the pressure applied to the brake fluid in the master cylinder will be transmitted to the brakes 7 and in order not to interfere with said transmission the upper end of each valve 11 is provided with the side notches 13 forming passageways which are not closed by the stop 10a when the valve is in its upper position, that is when the valve is floating in the brake fluid; however, should a leak occur in a brake or in a line leading to said brake, the brake fluid will drain out from the corresponding valve casing 8 and the valve therein will descend and seat on the corresponding seat 9 so as to prevent further leakage, and the brake fluid in the master cylinder will be retained and the other brakes will operate normally, and upon subsequent operation of the brake lever 2 pressure will be applied to the upper end of the seated valve so as to seat it more securely on the seat 9 to completely seal said seat and prevent any leakage past the valve.

When the leaking brake has been repaired or when the leakage in the line has been stopped, the lower end of the corresponding valve casing 8 may be disconnected from its line and a small rod inserted into the lower end of the casing and the valve unseated and the casing then connected back into the line and the valve will thereafter operate in a normal way.

What I claim is:

1. A safety valve assembly for hydraulic brakes comprising, a valve casing having an inlet at its upper end adapted to communicate with a master valve cylinder and having an outlet at its lower end adapted to communicate with a brake, said casing having a downwardly tapering valve seat and a stop spaced above said seat, a buoyant valve body in the casing whose lower end is shaped to conform to, and seat on said seat, and whose upper end is adapted to engage said stop, said valve body having a recess forming a bypass at its upper end to permit pressure of the brake fluid to be transmitted past the valve body, said valve body being movable downwardly upon discharge of the brake fluid from the casing to land on said seat to close the casing against the further discharge of the liquid and said lower end being frictionally engageable with said seat to hold the valve body against upward floating movement away from said seat under the influence of the liquid in the casing.

2. A valve assembly comprising, a cylindrical vertical valve casing having a downwardly converging seat and a stop spaced above the seat, said casing having an upper end inlet and a lower end discharge outlet for brake fluid, a solid buoyant valve body formed of resilient material movable vertically in the casing and adapted to close the seat when it reaches the limit of its downward movement and to contact said stop upon limit of its upward movement, said valve body having a lower end portion shaped to conform to said seat and to yieldingly engage the seat to hold the valve body against upward floating movement away from the seat under the influence of the liquid in the casing and also a bypass therethrough through which the pressure of the brake fluid is equalized when the valve body is in its upper position.

3. A safety valve assembly comprising, a valve casing having an inlet at its upper end and having an outlet at its lower end, said casing having a valve seat and an inside stop spaced above said seat, a buoyant valve movable in the casing between the seat and stop and of a less transverse diameter than the inside diameter of the casing, the lower end of the valve body being shaped to conform to, and to frictionally engage, said seat when the valve body is in its lower position to hold the valve body in engagement with the seat against the upward buoying action of the liquid in the casing to close said outlet the upper end of the valve body being adapted to engage said stop when the valve body is in its upper position, said valve body having a bypass therein through which the pressure of the fluid in the assembly above and beneath the valve body will be equalized when the valve body is in its upper position.

References Cited in the file of this patent

UNITED STATES PATENTS

| Number | Name | Date |
|---|---|---|
| 352,093 | Kupferle | Nov. 2, 1886 |
| 542,024 | McIlhenny | July 2, 1895 |
| 805,498 | Stewart | Nov. 28, 1905 |
| 852,334 | Lewis | Apr. 30, 1907 |
| 855,932 | Bryant | June 4, 1907 |
| 1,006,403 | Robertson | Oct. 17, 1911 |
| 1,593,519 | Underwood | July 20, 1926 |
| 1,890,513 | Kessler | Dec. 13, 1932 |
| 2,223,509 | Braver | Dec. 3, 1940 |
| 2,474,929 | Boler | July 5, 1949 |

FOREIGN PATENTS

| Number | Country | Date |
|---|---|---|
| 115,599 | Great Britain | 1917 |
| 19,222 | Holland | 1928 |
| 262,974 | Switzerland | 1949 |